United States Patent
Itaya

(10) Patent No.: US 12,124,199 B2
(45) Date of Patent: Oct. 22, 2024

(54) IMAGE FORMING APPARATUS WITH IMPROVED IMAGE DENSITY

(71) Applicant: TOSHIBA TEC KABUSHIKI KAISHA, Tokyo (JP)

(72) Inventor: Satoshi Itaya, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/180,157

(22) Filed: Mar. 8, 2023

(65) Prior Publication Data

US 2024/0302777 A1 Sep. 12, 2024

(51) Int. Cl.
G03G 15/00 (2006.01)
G06K 15/02 (2006.01)
H04N 1/00 (2006.01)

(52) U.S. Cl.
CPC ..... *G03G 15/5025* (2013.01); *G03G 15/5058* (2013.01); *G06K 15/027* (2013.01); *G06K 15/1872* (2013.01); *H04N 1/00045* (2013.01)

(58) Field of Classification Search
CPC ........... G03G 15/5025; G03G 15/5058; G06K 15/027; G06K 15/1872; H04N 1/00031; H04N 1/00045; H04N 1/00082; H04N 1/407; H04N 1/2338
See application file for complete search history.

(56) References Cited

U.S. PATENT DOCUMENTS

| | | | |
|---|---|---|---|
| 11,575,803 B1 | 2/2023 | Takeda | |
| 11,710,016 B1 * | 7/2023 | Terada | G06K 15/1872 358/1.1 |
| 2018/0205853 A1 | 7/2018 | Terada | |
| 2018/0234592 A1 * | 8/2018 | Honda | H04N 1/6019 |
| 2019/0064694 A1 * | 2/2019 | Nagai | G03G 15/04072 |

FOREIGN PATENT DOCUMENTS

| | | |
|---|---|---|
| JP | 2004-29217 | 1/2004 |
| JP | 2010-171689 | 8/2010 |
| JP | 2014-102437 | 6/2014 |
| JP | 2002-287053 | 10/2022 |

* cited by examiner

*Primary Examiner* — Sophia S Chen
(74) *Attorney, Agent, or Firm* — Amin, Turocy & Watson, LLP

(57) ABSTRACT

An image forming apparatus includes a forming unit, a storage unit, a correction unit, a measurement unit, and a changing unit. The forming unit forms an image. The storage unit stores correction data for correcting density irregularity in each of a plurality of regions obtained through division in a main scanning direction of the image formed by the forming unit. The correction unit corrects a density of the image formed by the forming unit for each of the plurality of regions based on the correction data stored in the storage unit. The measurement unit measures an image formation density by the forming unit in association with the correction by the correction unit. The changing unit changes the image formation density by the forming unit with a uniform change amount in the plurality of regions so that the image formation density measured by the measurement unit approaches a predetermined target density.

20 Claims, 7 Drawing Sheets

IMAGE FORMING APPARATUS WITH IMPROVED IMAGE DENSITY

FIELD

Embodiments described herein relate generally to an image forming apparatus and methods of improving image density in an image forming apparatus.

BACKGROUND

As one of apparatuses used in workplaces to construct office environments, remote work environments, or the like, an image forming apparatus is known.

In an image forming apparatus, even when pixels with the same density values are formed, irregularity may occur in density of actually formed pixels at each position in a main scanning direction. Such density irregularity is also called in-plane irregularity and is a cause for deterioration in image quality.

Various technologies for correcting such density irregularity have been devised. However, further improvement in image quality than image quality obtained by the technologies which have been devised so far is newly required.

DETAILED DESCRIPTION

In general, according to one embodiment, an image forming apparatus includes a forming unit, a storage unit, a correction unit, a measurement unit, and a changing unit. The forming unit forms an image. The storage unit stores correction data for correcting density irregularity in each of a plurality of regions obtained through division in a main scanning direction of the image formed by the forming unit. The correction unit corrects a density of the image formed by the forming unit for each of the plurality of regions based on the correction data stored in the storage unit. The measurement unit measures an image formation density by the forming unit in association with the correction by the correction unit. The changing unit changes the image formation density by the forming unit with a uniform change amount in the plurality of regions so that the image formation density measured by the measurement unit approaches a predetermined target density.

According to another embodiment, a method of improving image density in an image forming apparatus involves storing correction data for correcting density irregularity in each of a plurality of regions obtained through division in a main scanning direction of an image formed by a forming component; correcting a density of the image formed by the forming component for each of the plurality of regions based on the correction data stored; measuring an image formation density by the forming component in association with the correction; and changing the image formation density by the forming unit with a uniform change amount in the plurality of regions so that the image formation density measured approaches a predetermined target density.

Certain aspects of an image forming apparatus are described in U.S. Ser. No. 15/641,954A, filed Jul. 5, 2017 and titled "IMAGE FORMING APPARATUS THAT APPLIES CORRECTION SELECTIVELY TO A SUBSET OF PIXELS," the contents of which are all hereby incorporated by reference.

Hereinafter, an embodiment will be described with reference to the drawings. In the following embodiments, a multi-function peripheral (MFP) including an image forming apparatus as a printer will be described as an example.

First, a configuration of the MFP according to the embodiment will be described.

Figure 1:
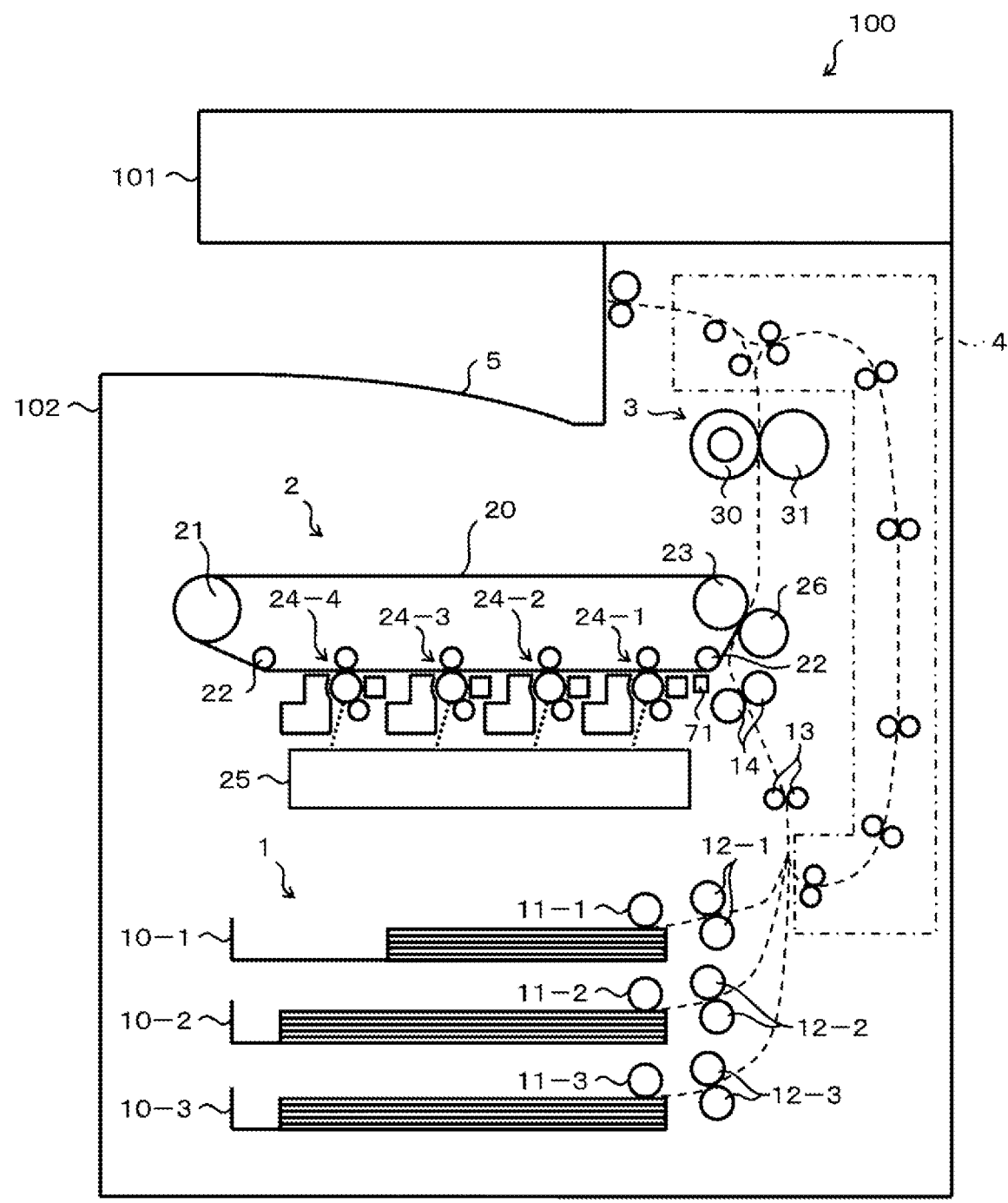
FIG. 1 is a diagram schematically illustrating a mechanical configuration of an MFP according to an embodiment.

FIG. 1 is a diagram schematically illustrating a mechanical configuration of an MFP 100 according to the embodiment.

As illustrated in FIG. 1, the MFP 100 includes a scanner 101 and a printer 102.

The scanner 101 reads an image of a document and generates image data corresponding to the read image. The scanner 101 generates image data in accordance with a reflected light image from a read surface of the document, for example, using an image sensor such as a charge-coupled device (CCD) line sensor. The scanner 101 scans a document placed on a document table using an image sensor moving along the document. Alternatively, the scanner 101 scans a document conveyed by an auto documents feeder (ADF) using a fixed image sensor. The scanner 101 is an example of a reading unit.

The printer 102 forms an image on a medium which is an image forming target in conformity with an electrographic scheme. The medium is typically a print sheet such as a cut sheet. Accordingly, a print sheet is used as a medium in the following description. Note that, a sheet made of paper different from the cut sheet may be used or a sheet made of a material such as a resin other than paper may be used as a medium. The printer 102 has a color printing function of printing a color image on a print sheet and a monochromic printing function of printing a monochromic image on a print sheet. The printer 102 forms a color image by superimposing and forming element images, for example, using toner of three colors of yellow, magenta, and cyan or four colors thereof in addition to black. The printer 102 forms a monochromic image, for example, using black toner. Note that, the printer 102 may have only one of the color printing function and the monochromic printing function.

In the configuration example illustrated in FIG. 1, the printer 102 includes a feeding unit 1, a print engine 2, a fixing unit 3, an automatic double-sided unit (ADU) 4, and a discharging tray 5.

The feeding unit 1 includes feeding cassettes 10-1, 10-2, and 10-3, pickup rollers 11-1, 11-2, and 11-3, conveyance rollers 12-1, 12-2, and 12-3, conveyance rollers 13, and registration rollers 14.

The feeding cassettes 10-1, 10-2, and 10-3 accommodate print sheets in a stacked state. The print sheets accommodated in the feeding cassettes 10-1, 10-2, and 10-3 may be different types of sheets with different sizes and materials or may be the same types of print sheets. The feeding unit 1 may also include a manual feed tray.

The pickup rollers 11-1, 11-2, and 11-3 pick up the print sheets one by one from the feeding cassettes 10-1, 10-2, and 10-3. The pickup rollers 11-1, 11-2, and 11-3 send the picked up sheets to the conveyance rollers 12-1, 12-2, and 12-3.

The conveyance rollers 12-1, 12-2, and 12-3 send the print sheets sent from the pickup rollers 11-1, 11-2, and 11-3 to the conveyance rollers 13 via conveyance paths formed by guide members or the like (not illustrated).

The conveyance rollers 13 further feed the print sheets sent from any of the conveyance rollers 12-1, 12-2, and 12-3 to send the print sheet to the registration rollers 14.

The registration rollers 14 correct an inclination of the print sheet. The registration rollers 14 adjust a timing at which the print sheet is sent to the print engine 2.

The feeding cassettes, the pickup rollers, and the conveyance rollers are not limited to three sets, but any number of sets may be provided. When a manual feed tray is provided, any one set of a feeding cassette and paired pickup rollers and conveyance rollers may not be provided.

The print engine 2 includes a belt 20, support rollers 21, 22, and 23, image forming units 24-1, 24-2, 24-3, and 24-4, an exposure unit 25, and a transfer roller 26.

The belt 20 formed in an endless shape is supported by the support rollers 21, 22, and 23 so that the state illustrated in FIG. 1 is kept. The belt 20 is rotated counterclockwise in FIG. 1 with rotation of the support roller 21. The belt 20 temporarily carries toner images to be formed on a print sheet on a surface located outside (hereinafter referred to as an image carrying surface). That is, the belt 20 is an example of an image carrying body. In the belt 20, for example, semiconductive polyimide is used from the viewpoint of heat resistance and abrasion resistance. So-called sub-scanning is implemented by movement of the image carrying surface associated with the rotation of the belt 20, and a movement direction of the image carrying surface is also referred to as a sub-scanning direction.

Each of the image forming units 24-1 to 24-4 includes a photoconductor, a charging roller, a developing unit, a transfer roller, and a cleaner and cooperates with the exposure unit 25 to form an image in conformity with the electrographic scheme. The image forming units 24-1 to 24-4 are arranged along the belt 20 with a shaft direction of each photoconductor being parallel to each other. The image forming units 24-1 to 24-4 are different in color of toner to be used and are similar in a configuration and an operation. The image forming unit 24-1 forms an element image using, for example, black toner. The image forming unit 24-2 forms an element image using, for example, cyan toner. The image forming unit 24-3 forms an element image using, for example, magenta toner. The image forming unit 24-4 forms an element image using, for example, yellow toner. Each of the image forming units 24-1 to 24-4 is an example of an element image forming unit. Thus, each of the image forming units 24-1 to 24-4 is an example of an element image forming unit. The image forming units 24-1 to 24-4 superimpose the element images of each color on the image carrying surface of the belt 20. Accordingly, the image forming units 24-1 to 24-4 form a color image in which each element image of each color is superimposed on the image carrying surface of the belt 20 at a time point of passing through the image forming unit 24-1. Although not illustrated, a developer container that accommodates developer containing toner of each color is disposed, for example, in a space above the belt 20. The developer may be one-component type developer containing only toner or multi-component type developer containing other materials such as carriers in addition to the toner.

The exposure unit 25 exposes the photoconductor of each of the image forming units 24-1 to 24-4 in accordance with image data indicating the element image of each color. As the exposure unit 25, a laser scanner, a light emitting diode (LED) head, or the like is used. The exposure unit 25 includes, for example, a semiconductor laser element, a polygon mirror, an imaging lens system, and a mirror when a laser scanner is used. In this case, the exposure unit 25 causes a laser beam emitted from, for example, the semiconductor laser element in accordance with the image data to be selectively incident on the photoconductor of each of the image forming units 24-1 to 24-4 by switching an emission direction by the mirror. The exposure unit 25 scans the laser beam in a shaft direction (a depth direction in FIG. 1) of the photoconductor by a polygon mirror. Scanning of the laser beam is referred to as so-called main scanning and a direction of the scanning is referred to as a main scanning direction.

The transfer roller 26 is disposed parallel to the support roller 23 and interposes the belt 20 between the transfer roller 26 and the support roller 23. The transfer roller 26 interposes a print sheet sent from the registration roller 14 between the transfer roller 26 and the image carrying surface of the belt 20. The transfer roller 26 transfers the toner images formed on the image carrying surface of the belt 20 to a print sheet using an electrostatic force. That is, a transfer unit is formed by the support roller 23 and the transfer roller 26. The toner which has not been completely transferred to the print sheet remains on the image carrying surface of the belt 20. Therefore, the toner adhered to the image carrying surface of the belt 20 after passing between the support roller 23 and the transfer roller 26 is removed by a cleaner (not illustrated) before reaching the image forming unit 24-4.

Thus, the print engine 2 forms an image on the print sheet sent by the registration roller 14 in conformity with the electrographic scheme. That is, the print engine 2 is an example of a forming unit.

The fixing unit 3 includes a fixing roller 30 and a pressurization roller 31.

The fixing roller 30 accommodates a heater inside a hollow roller formed of, for example, a resin with heat resistance. The heater is, for example, an induction heating (IH) heater, but any type of different heater can be appropriately used. The fixing roller 30 fixes the toner to the print sheet by melting the toner adhered to the print sheet sent from the print engine 2.

The pressurization roller 31 is provided parallel to the fixing roller 30 to be pressurized against the fixing roller 30. The pressurization roller 31 interposes the print sheet sent from the print engine 2 between the pressurization roller 31 and the fixing roller 30 to press the print sheet against the fixing roller 30.

The ADU 4 includes a plurality of rollers and selectively performs the following two operations. In a first operation, the print sheet passing through the fixing unit 3 is sent to the discharging tray 5 as it is. The first operation is performed when one-sided print or double-sided print is completed. In a second operation, after the print sheet passing through the fixing unit 3 is temporarily conveyed to the side of the discharging tray 5, the print sheet is switched back to be sent to the print engine 2. The second operation is preformed when forming of an image is completed on only one surface in double-sided printing.

The discharging tray 5 receives the discharged print sheet on which the image has been formed.

Figure 2:
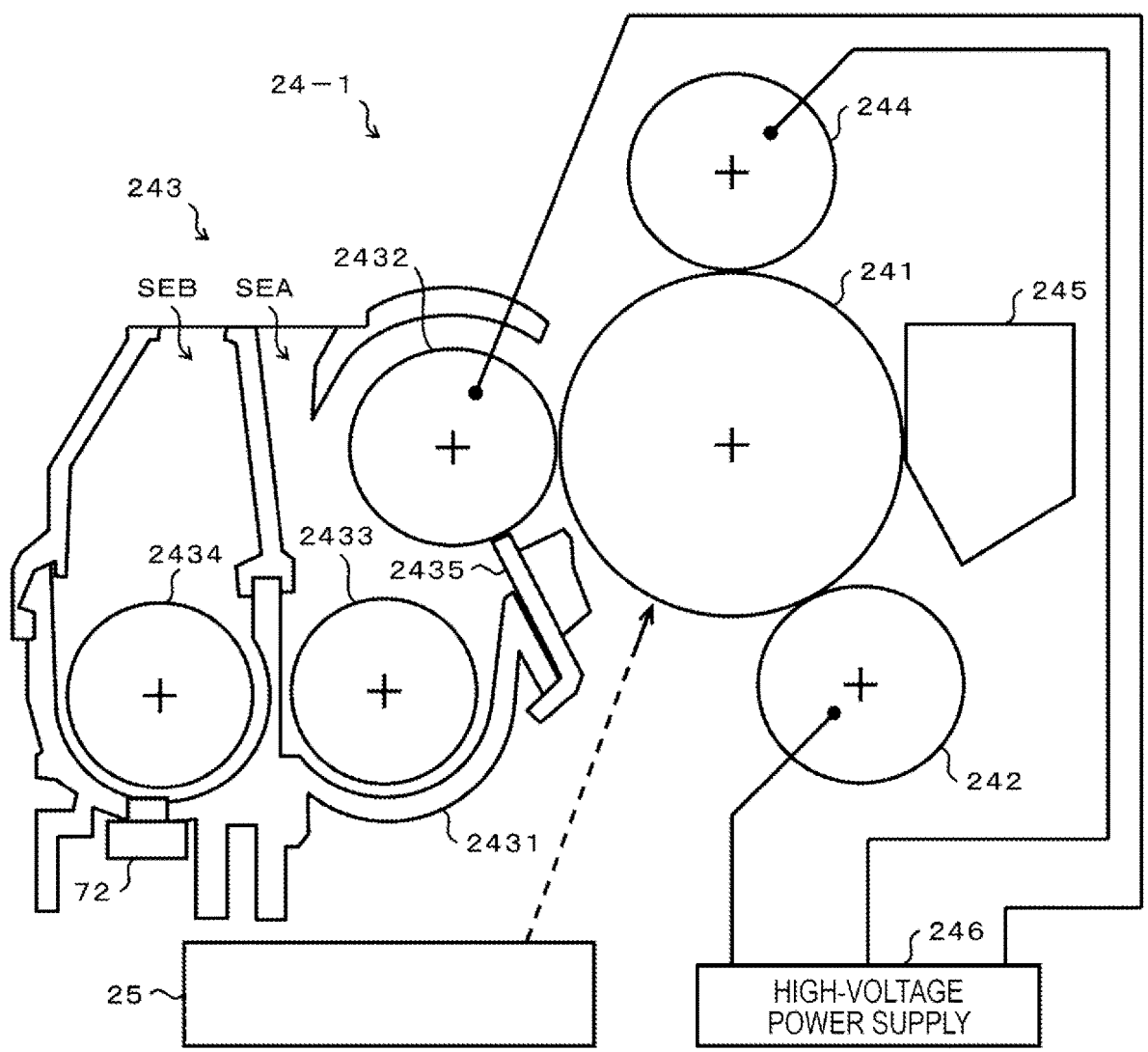
FIG. 2 is a breakaway diagram illustrating a part of a configuration of main units of image forming units in FIG. 1.

FIG. 2 is a breakaway diagram illustrating a part of a configuration of main units of image forming units 24-1 to 24-4.

Since the image forming units 24-1 to 24-4 have the same configuration, only the configuration of the image forming unit 24-1 is illustrated in FIG. 2 and the configurations of the image forming units 24-2 to 24-4 are not illustrated and will not be described.

The image forming unit 24-1 is configured so that a charging roller 242, a developing unit 243, a transfer roller 244, and a cleaner 245 are disposed around a photoconductor 241. The image forming unit 24-1 includes a high-voltage power supply 246.

The photoconductor 241 is configured such that a photoconductive material is applied to a curved surface of a base in which, for example, a conductor such as aluminum is formed in a cylindrical shape and a photoconductive layer is formed. A surface on which the photoconductive layer of the photoconductor 241 is formed is referred to as a photoconductive surface. The photoconductor 241 is supported to be rotatable in a casing or the like of the image forming unit 24-1 at a position orienting a shaft center direction in a depth direction in FIG. 2.

The charging roller 242 is formed by forming a conductor such as a conductive rubber in a columnar shape. The charging roller 242 is supported to be rotatable in the casing or the like of the image forming unit 24-1 at the position orienting the shaft center direction in a depth direction in FIG. 2. A curved surface of the charging roller 242 is in contact with or close to the photoconductive surface of the photoconductor 241. The charging roller 242 is supplied with a charging voltage by the high-voltage power supply 246 and uniformly charges the photoconductive surface of the photoconductor 241. Instead of the charging roller 242, the photoconductive surface of the photoconductor 241 may be uniformly charged using, for example, another type of charger of a scorotron system.

The developing unit 243 includes a casing 2431, a developing sleeve 2432, mixers 2433 and 2434, and a doctor blade 2435.

The casing 2431 forms a space where developer is accommodated inside. That is, the casing 2431 functions as a container that accommodates the developer. The space inside the casing 2431 is divided into partitions SEA and SEB. The partitions SEA and SEB are connected via an opening (not illustrated in FIG. 2). Developer appropriate for the developing unit 243 is two-component developer in which, for example, toner and carriers are mixed.

The developing sleeve 2432 formed in a columnar shape is supported to be rotatable in the casing 2431 at a position orienting the shaft center direction in a depth direction in FIG. 2 and is partially located in the partition SEA. The developing sleeve 2432 contains a magnet disposed so that magnetic poles are alternately formed in a circumferential direction along a circumferential surface. The developing sleeve 2432 is supplied with a development bias from the high-voltage power supply 246 and adheres the toner to the photoconductive surface of the photoconductor 241 electrostatically in accordance with an electrostatic latent image formed in the photoconductive surface.

The mixers 2433 and 2434 are configured so that a stirring bar is fixed to a rotation shaft. The mixer 2433 is supported to be rotatable in the casing 2431 at a position orienting the shaft center direction of the rotation shaft in the depth direction in FIG. 2 and is located near a bottom of the partition SEA. The mixer 2434 is supported to be rotatable in the casing 2431 at a position orienting the shaft center direction of the rotation shaft in the depth direction in FIG. 2 and is located near a bottom of the partition SEB. The mixers 2433 and 2434 are rotated in a region where the stirring bar is indicated in a circular shape in FIG. 2 with rotation around the rotation shaft.

The doctor blade 2435 formed in a plate shape is fixed to the casing 2431 so that a tip end is close to the curved surface of the developing sleeve 2432. The doctor blade 2435 limits an amount of developer moving from the partition SEA to the outside of the casing 2431 with rotation of the developing sleeve 2432.

The transfer roller 244 formed in a columnar shape is supported to be rotatable in the casing or the like of the image forming unit 24-1 at a position orienting the shaft center direction in the depth direction in FIG. 2. The transfer roller 244 faces the photoconductor 241 and interposes the belt 20 between the transfer roller 244 and the photoconductive surface of the photoconductor 241. The belt 20 is not illustrated in FIG. 2. The transfer roller 244 is supplied with a transfer bias by the high-voltage power supply 246 and electrostatically transfers the toner adhered to the photoconductive surface of the photoconductor 241 to the belt 20.

The cleaner 245 contains a cleaning blade of which a tip end is in contact with or close to the photoconductive surface of the photoconductor 241. The cleaner 245 scrapes the toner remaining on the photoconductive surface by the cleaning blade to collect the toner.

Figure 3:
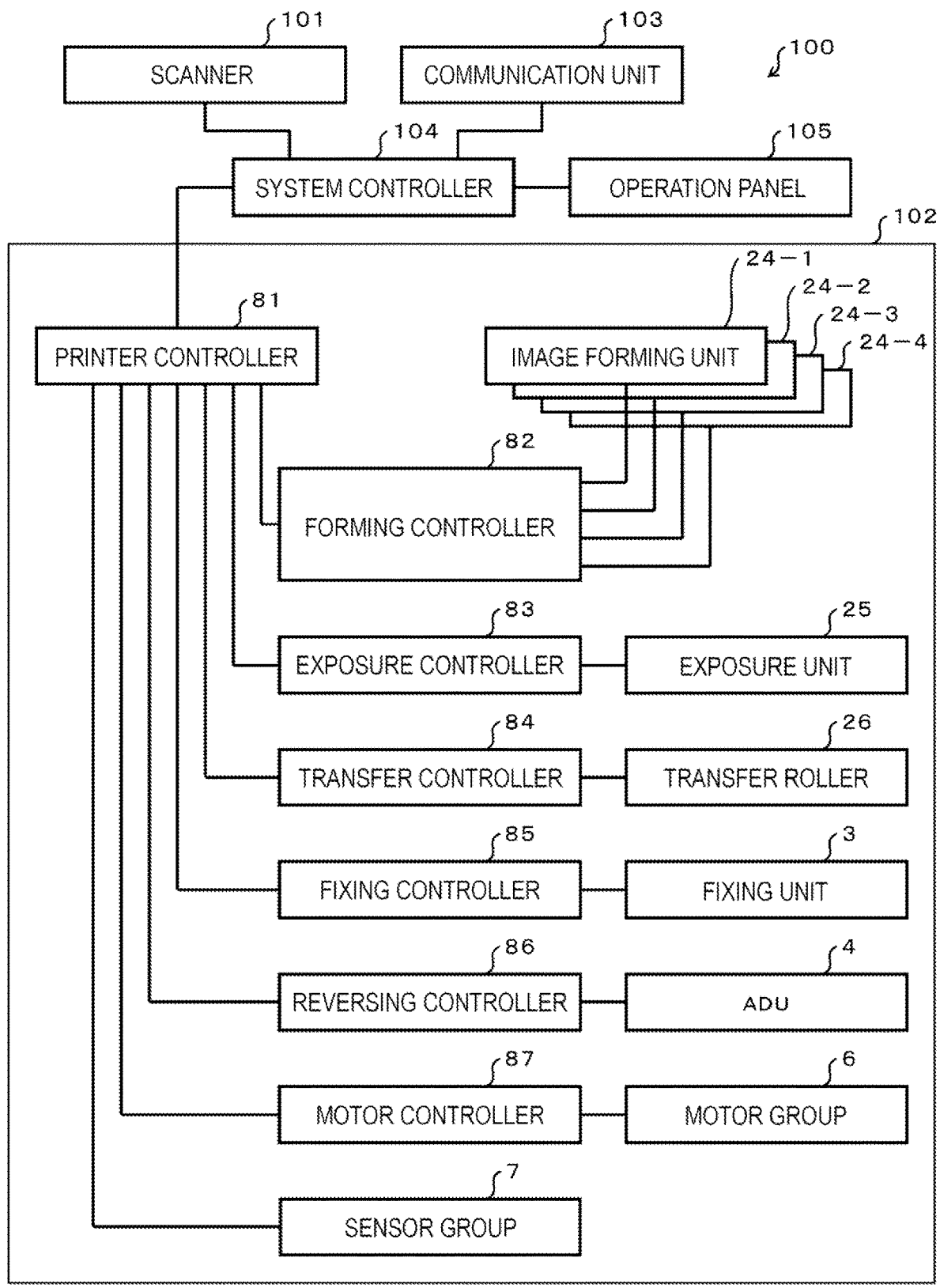
FIG. 3 is a block diagram schematically illustrating a configuration related to control of the MFP in FIG. 1.

FIG. 3 is a block diagram schematically illustrating a configuration related to control of the MFP 100. In FIG. 3, the same reference numerals are given to the same elements as those illustrated in FIG. 1 and detailed description thereof will be omitted.

The MFP 100 includes a communication unit 103, a system controller 104, and an operation panel 105 in addition to the scanner 101 and the printer 102.

The communication unit 103 performs a process of communicating with an information terminal such as a computer apparatus and an image terminal such as a facsimile apparatus via a communication network such as a local area network (LAN) and a public communication network.

The system controller 104 generally controls each unit included in the MFP 100 to implement a predetermined operation of the MFP 100. The predetermined operation of the MFP 100 is, for example, an operation of implementing various functions implemented by, for example, an existing MFP.

The operation panel 105 includes an input device and a display device. The operation panel 105 inputs an instruction from an operator using the input device. The operation panel 105 displays various types of information of which the operator is to be notified on the display device. As the operation panel 105, for example, a touch panel, various switches, and various lamps, or the like can be used singly or in appropriate combination.

The fixing unit 3, the ADU 4, the image forming units 24-1 to 24-4, the exposure unit 25, and the transfer roller 26 included in the printer 102, as described above, are elements which are control targets. The printer 102 includes a motor group 6 which is a control target in addition to these elements. The motor group 6 includes a plurality of motors for rotating various rotators included in the pickup rollers 11-1, 11-2, and 11-3, the conveyance rollers 12-1, 12-2, and 12-3, the conveyance rollers 13, the registration rollers 14, the support roller 21, the transfer roller 26, the fixing roller 30, and the image forming units 24-1 to 24-4 and rotating rollers included in the ADU 4.

The printer 102 further includes a sensor group 7, a printer controller 81, a forming controller 82, an exposure controller 83, a transfer controller 84, a fixing controller 85, a reversing controller 86, and a motor controller 87.

The sensor group 7 includes various sensors that monitor an operation state of the apparatus. As illustrated in FIG. 1, the sensor group 7 includes an adhesion amount sensor 71 disposed to face the image carrying surface of the belt 20 at a position between the image forming unit 24-1 and the transfer roller 26. The adhesion amount sensor 71 measures an amount of toner adhered to the image carrying surface of the belt 20. As the adhesion amount sensor 71, for example, an optical sensor that measures an adhesion amount as an amount of reflected light can be used. As illustrated in FIG. 2, the sensor group 7 includes a density sensor 72 is fixed to the bottom of the partition SEB of the casing 2431. The density sensor 72 measures density of the developer.

The printer controller 81 generally controls each unit included in the printer 102 to implement a predetermined operation of the printer 102 under the control of the system controller 104.

The forming controller 82, the exposure controller 83, the transfer controller 84, the fixing controller 85, the reversing controller 86, and the motor controller 87 all operate under the control of the printer controller 81 and respectively control operations of the image forming units 24-1 to 24-4, the exposure unit 25, the transfer roller 26, the ADU 4, and the motor group 6.

Figure 4:
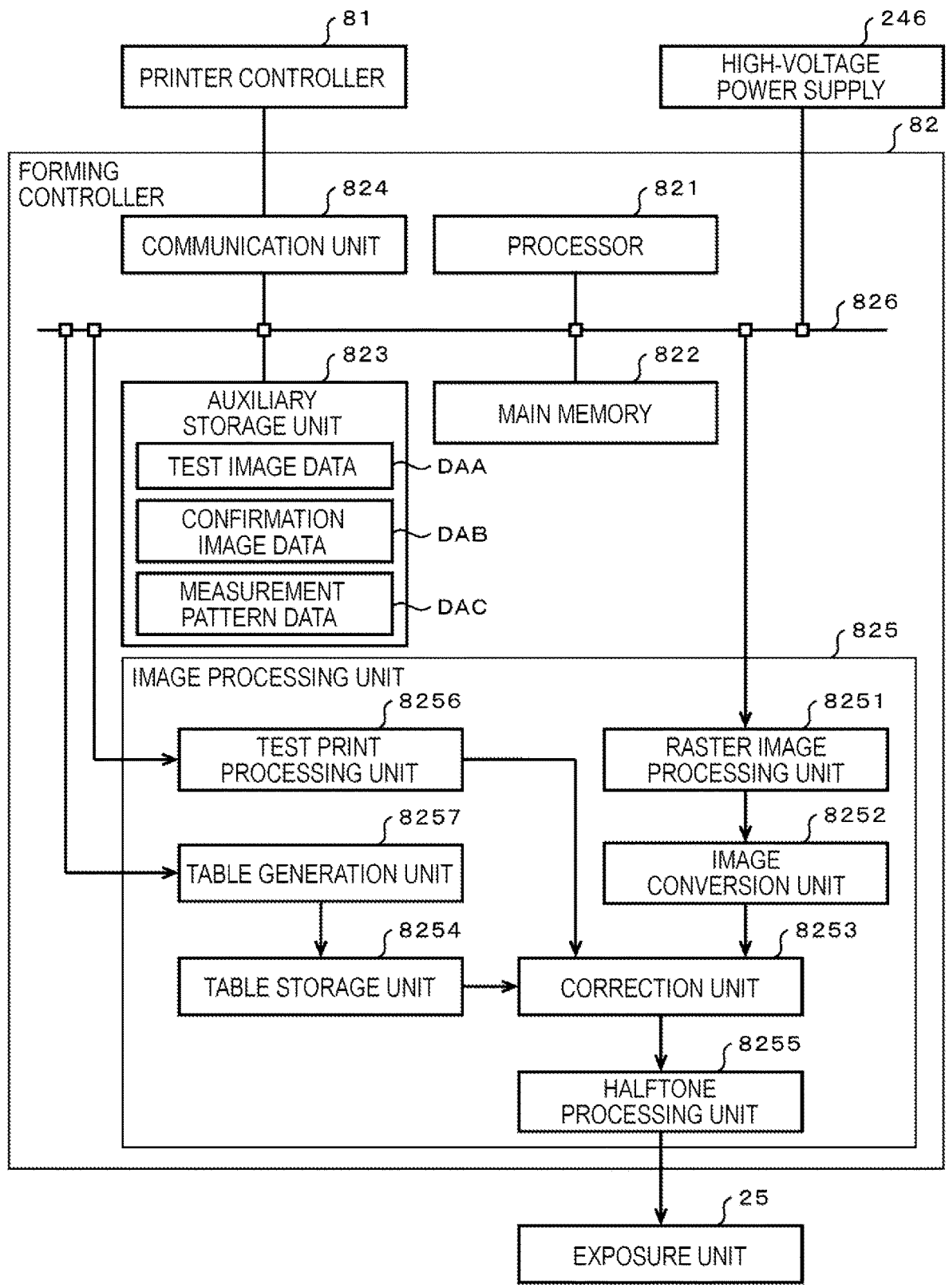
FIG. 4 is a block diagram illustrating a circuit configuration of main units of a forming controller in FIG. 3.

FIG. 4 is a block diagram illustrating a circuit configuration of main units of the forming controller 82. The forming controller 82 includes a processor 821, a main memory 822, an auxiliary storage unit 823, a communication unit 824, an image processing unit 825, and a transmission path 826.

By connecting the processor 821, the main memory 822, and the auxiliary storage unit 823 with the transmission path 826, a computer that performs information processing to control the image forming units 24-1 to 24-4 is configured.

The processor 821 corresponds to a central unit of the computer. The processor 821 performs information processing to be described below in accordance with an information processing program such as an operating system, middleware, and an application program.

The main memory 822 corresponds to a main memory portion of the computer. The main memory 822 includes a nonvolatile memory area and a volatile memory area. The main memory 822 stores an information processing program in the nonvolatile memory area. The main memory 822 stores data necessary for the processor 821 to perform a process of controlling each unit in the nonvolatile or volatile memory area in some cases. The main memory 822 uses the volatile memory area as a working area where the processor 821 appropriately rewrites data.

The auxiliary storage unit 823 corresponds to an auxiliary storage portion of the computer. As the auxiliary storage unit 823, for example, known storage devices such as an electric erasable programmable read-only memory (EEPROM), a hard disc drive (HDD), and a solid-state drive (SSD) can be used singly or plurally in combination. The auxiliary storage unit 823 stores data used for the processor 821 to perform various processes or data generated through the processes by the processor 821. The auxiliary storage unit 823 stores an information processing program. The auxiliary storage unit 823 stores test image data DAA, confirmation image data DAB, and measurement pattern data DAC as data used for the processor 821 to perform various processes. The test image data DAA, the confirmation image data DAB, and the measurement pattern data DAC will be described below.

The communication unit 824 communicates with the printer controller 81.

The image processing unit 825 includes four forming controllers 82 corresponding to the image forming units 24-1 to 24-4. The four image processing units 825 set element images formed in the corresponding image forming units as processing targets. That is, for example, the image processing unit 825 corresponding to the image forming unit 24-1 sets a black element image as a processing target. Hereinafter, color of an element image set as a processing target is referred to as target color. The four image processing units 825 have the same configuration. In FIG. 4, the configuration of one image processing unit 825 is illustrated and the other three image processing units 825 are not illustrated.

The image processing unit 825 includes a raster image processing unit 8251, an image conversion unit 8252, a correction unit 8253, a table storage unit 8254, a halftone processing unit 8255, a test print processing unit 8256, and a table generation unit 8257.

The raster image processing unit 8251 converts image data given as a print target into element image data in which an element image of target color is expressed in a raster format. A specific process performed by the raster image processing unit 8251 may be, for example, a process similar to, for example, a process performed in the same type of known apparatus.

The image conversion unit 8252 performs a conversion process such as a color conversion process and a filtering process on the element image data obtained in the raster image processing unit 8251. A specific process performed by the image conversion unit 8252 may be a process similar to, for example, a process performed in the same type of known apparatus.

The correction unit 8253 performs a correction process of the element image data for correcting in-plane irregularity with reference to the table storage unit 8254. The correction process in the correction unit 8253 will be described below.

The table storage unit 8254 stores a correction table for correcting in-plane irregularity. The correction table will be described below.

The element image data corrected in the correction unit 8253 is given to the halftone processing unit 8255. The element image data has the raster format as it is. The halftone processing unit 8255 converts image data output from the correction unit 8253 into element image data with a pseudo-halftone format, for example, using an error diffusion method, a dither method, or a density pattern method. A specific process performed by the halftone processing unit 8255 may be a process similar to, for example, a process performed in the same type of known apparatus.

The test print processing unit 8256 performs a process of printing a test image under an instruction given by the processor 821.

The table generation unit 8257 generates a correction table based on image data obtained by causing the scanner 101 to read the test image and updates the correction table stored in the table storage unit 8254.

The transmission path 826 includes an address bus, a data bus, and a control signal line and transmits data and control signals transmitted to and received from each of the connected units.

Next, an operation of the MFP 100 that has such a configuration will be described. Contents of various operations and various processes to be described below is exemplary, and changes in procedures of some of the operations and the processes, omissions of some of the operations and the processes, or additions of other operations and processes can be appropriately made.

Operations different from operations of the same type of existing MFP will be mainly described below and other operations will not be described. A characteristic operation of the MFP 100 according to the embodiment is an operation of the forming controller 82.

When the printer 102 prints an image and print target image data indicates a color image, the processor 821 gives the image data to the four image processing units 825. That is, the color image data is input to each of the four raster image processing units 8251. The four raster image processing units 8251 generate element image data indicating element images of each color of black, cyan, magenta, and yellow in the raster format, respectively, from given image data.

The element image data of each color is processed by each of the four image processing units 825. Hereinafter, a process related to element image data of one color will be described.

The image conversion unit 8252 performs a conversion process such as a color conversion process and a filtering process on the element image data generated by the raster image processing unit 8251. A part of the conversion process is a process in which characteristics of target color are taken into consideration.

The correction table stored in the table storage unit 8254 is a data table in which output values are associated with a plurality of input values. The plurality of input values are grayscale values expressed in the element image data generated by the raster image processing unit 8251. That is, when grayscale values of 0 to 255 are used for the element image data generated by the raster image processing unit 8251, input values of the correction table are values of 0 to 255. Output values indicate grayscale values corrected from grayscale values indicated in the element image data generated by the raster image processing unit 8251. The input values are same as the output values in some cases. In the correction table, the association of the input values with the output values is expressed in relation to each of a plurality of regions set by dividing a print width in the main scanning direction in the image forming units 24-1 to 24-4. In the embodiment, it is assumed that the print width in the main scanning direction is equally divided into four regions and the four regions of first, second, third, and fourth regions are set.

The correction unit 8253 substitutes grayscale values indicated in the element image data output from the raster image processing unit 8251 with the output values associated with the same input values in the correction table in relation to regions to which pixel positions to which the grayscale values are applied belong. Accordingly, the grayscale values indicated in the element image data are adjusted for each region, and thus correction of in-plane irregularity is achieved.

The corrected element image data is converted into element image data with the pseudo-halftone format by the halftone processing unit 8255, and then the converted data is supplied to the exposure unit 25 to expose the target color. That is, by adjusting an exposure amount in the exposure unit 25 in each of the first, second, third, and fourth regions, the in-plane irregularity of the element images formed by the image forming units 24-1 to 24-4 are corrected.

Incidentally, for example, due to a difference in the degree of partial deterioration of photoconductive drums, an occurrence situation of in-plane irregularity gradually changes when images are formed in the image forming units 24-1 to 24-4. Finally, the correction table stored in the table storage unit 8254 may become improper to correction of the in-plane irregularity. In this case, the in-plane irregularity may be not able to be corrected sufficiently in the correction process in the correction unit 8253, and thus the in-plane irregularity of a printed image may be conspicuous.

A maintenance worker such as a user or a serviceman noticing an increase in in-plane irregularity on a printed image performs, for example, a predetermined operation in the operation panel 105 to give an instruction for adjusting the correction of the in-plane irregularity. In response to this instruction, the printer controller 81 instructs the forming controller 82 to start the adjustment. In response to this instruction, the processor 821 of the forming controller 82 starts information processing (hereafter referred to as an adjustment process) to be described below in accordance with an information processing program stored in the main memory 822 or the auxiliary storage unit 823.

Figure 5:
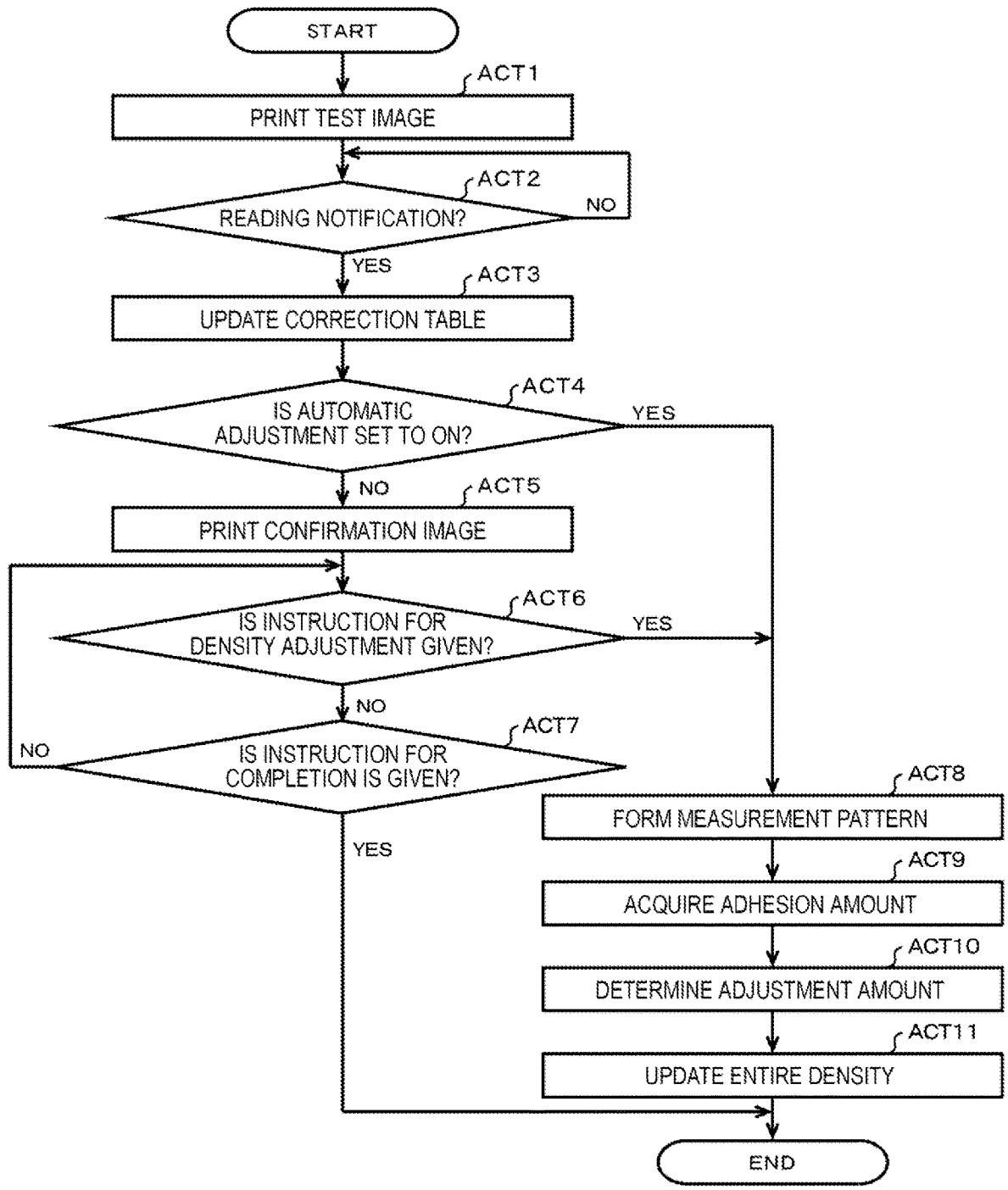
FIG. 5 is a flowchart illustrating an adjustment process.

FIG. 5 is a flowchart illustrating an adjustment process.

In ACT1, the processor 821 prints a test image. For example, the processor 821 starts operations of the image forming units 24-1 to 24-4, and then reads the test image data DAA stored in the auxiliary storage unit 823 and sends the test image data DAA to the four test print processing units 8256.

Figure 6:
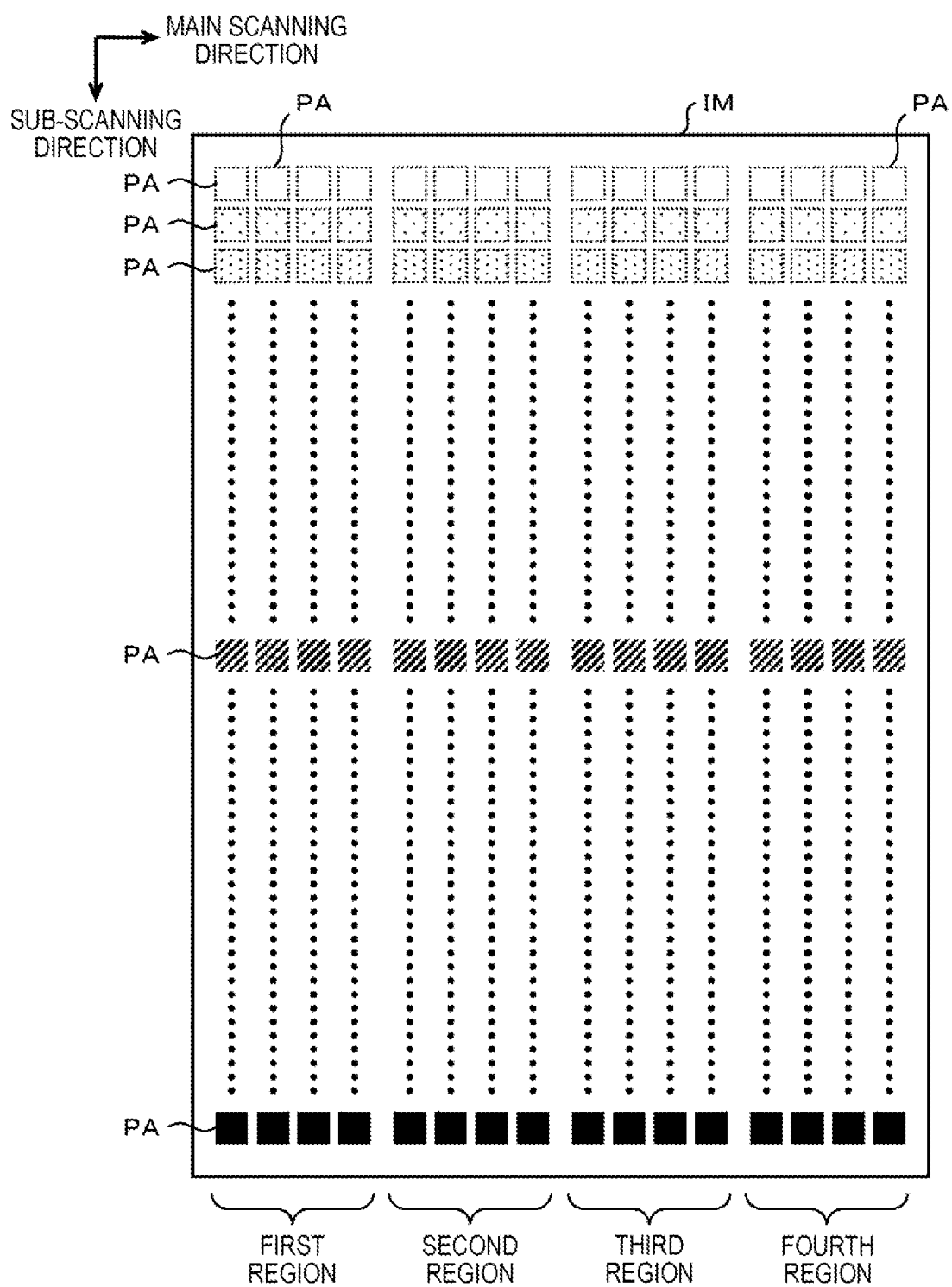
FIG. 6 is a diagram illustrating a test image indicated by test image data.

FIG. 6 is a diagram illustrating a test image IM indicated by the test image data DAA.

The test image IM is an image in which a large number of patches PA are arranged in the main scanning direction and the sub-scanning direction. Here, in FIG. 6, only some of the patches PA are illustrated and the other many patches PA are not illustrated. In FIG. 6, an aspect of the arrangement of the patches is mainly illustrated and each patch does not reliably represent actual patch.

The test image IM includes four patches PA arranged in the main scanning direction in each of the first to fourth regions. The color of the four patches PA is respectively yellow, magenta, cyan, and black. All the patches PA arranged in the main scanning direction have the same grayscale values. That is, of the plurality of patches PA arranged in the main scanning direction, four patches located in different regions all have the same color and the same grayscale value.

In the test image IM, the plurality of patches PA arranged in the sub-scanning direction all have the same color. The plurality of patches PA arranged in the sub-scanning direction have different grayscale values. A grayscale value of the patch PA shown uppermost in FIG. 6 is the minimum and a grayscale value gradually increases toward the lower side in FIG. 6. Hereinafter, the plurality of patches PA arranged in the sub-scanning direction are referred to as a patch column. In the test image IM, a plurality of patch columns are arranged in the main scanning direction. The degree of change in the grayscale value of each patch PA in one patch column is similar in each patch column.

Thus, in the first to fourth regions, a situation in which each patch PA is formed is the same, including all the patch columns of each color.

The test print processing unit 8256 generates element image data regarding the element image of target color in the test image IM from the test image data DAA and gives the generated element image data to the correction unit 8253. The element image data is subjected to each process by the correction unit 8253 and the halftone processing unit 8255, and then is supplied to the exposure unit 25. Through a known forming operation by the image forming units 24-1 to 24-4 and the exposure unit 25, black patches are formed by the image forming unit 24-1, cyan patches are formed by the image forming unit 24-2, magenta patches are formed by the image forming unit 24-3, and yellow patches are formed by the image forming unit 24-4 on the image carrying surface of the belt 20. The print sheet to which the test image IM formed on the image carrying surface of the belt 20 is transferred and fixed by the transfer roller 26 and the fixing unit 3 is discharged to the discharging tray 5.

In the test image IM printed on a print sheet in this way, due to an influence of in-plane irregularity, a difference in density of each of the first to fourth regions occurs between the patches PA arranged in the main scanning direction. That is, the image indicated by the test image data DAA and the actually printed test image IM have the same arrangement of the patches PA and different density relation between the patches PA.

A maintenance worker sets a print sheet on which the test image IM has been printed and which has been discharged to the discharging tray 5 in the scanner 101 and performs, for example, a predetermined operation on the operation panel 105 to give a reading instruction. In response to this instruction, when the scanner 101 reads the test image IM, the system controller 104 notifies the forming controller 82 of the reading. Subsequently, the system controller 104 sends image data generated by the scanner 101 (hereinafter referred to as read data) to the forming controller 82.

Then, the processor 821 proceeds to ACT2 in FIG. 5 when the printing of the test image IM is completed.

In ACT2, the processor 821 waits for a reading notification. When the system controller 104 notifies of the reading in this way, the processor 821 determines YES and proceeds to ACT3.

In ACT3, the processor 821 updates the correction table. For example, the processor 821 instructs the table generation unit 8257 to start the updating, and then sends the read data sent from the system controller 104 to the table generation unit 8257.

When the instruction to start the updating is given and the read data is sent, the table generation unit 8257 analyzes the read data to obtain a relation between a density value of each patch PA indicated by the test image data DAA (hereinafter referred to as an original density value) and a density value of each patch PA indicated by the read data (hereinafter referred to as a read value) for each region with regard to the target color.

The table generation unit 8257 obtains a straight-line approximation expression related to dispersion data obtained by plotting density values indicated by the read data with regard to each of the plurality of patches PA included in one patch column, for example, in a coordinate system in which a position in the test image IM in the sub-scanning direction is set as the horizontal axis and a density value indicated by the read data is set as the vertical axis. For example, the table generation unit 8257 obtains such a straight-line approximation expression related to each of four patch columns of the target color.

Figure 7:
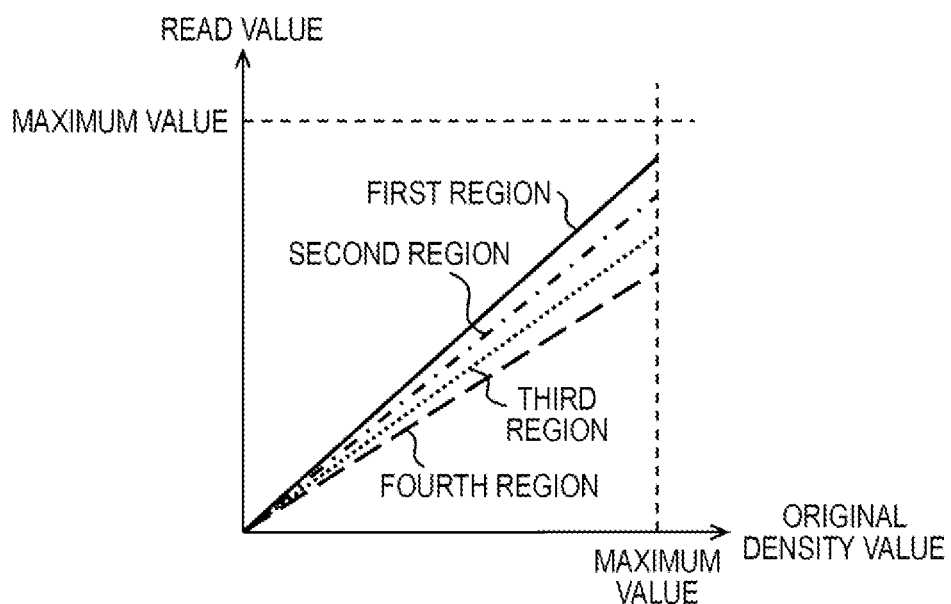
FIG. 7 is a diagram illustrating an approximate straight line expressed in a straight-line approximation expression in first to fourth regions for one color.

FIG. 7 is a diagram illustrating an approximate straight line expressed in a straight-line approximation expression obtained in relation to the first to fourth regions with regard to one color.

Since a grayscale value of each patch PA in the patch column of the test image IM gradually changes in the sub-scanning direction, a position in the test image IM in the sub-scanning direction corresponds to an original density value. Therefore, the horizontal axis represents an original density value in FIG. 7.

FIG. 7 illustrates an example in which density of patches in the test image IM printed actually in each region decreases more than the original density value and a decrease rate increases toward the fourth region.

The table generation unit 8257 sets a region where the decrease rate of the read density value to the original density value is the largest, that is, a region where an inclination of the straight-line approximation expression is the smallest as a reference region. The table generation unit 8257 generates a correction table so that input values and output values which are the same as the input values are indicated in association in the reference region, and input values and output values which are smaller than the input values are indicated in association in the other regions. The table generation unit 8257 determines output values in the regions other than the reference region, for example, so that a difference between a decrease rate of the density in the regions and a decrease rate of the density in the reference region is compensated for. The table generation unit 8257 generates the correction table as a data table indicated, for example, by associating the determined output values with the input values for each region in this way. Then, the table generation unit 8257 rewrites the correction table stored in the table storage unit 8254 with the correction table generated in this way. Here, the correction table is an example of the correction data. Thus, the table generation unit 8257 corresponds to a generation unit that generates the correction table serving as correction data. The table storage unit 8254 corresponds to a storage unit that stores a correction table serving as correction data.

Figure 8:
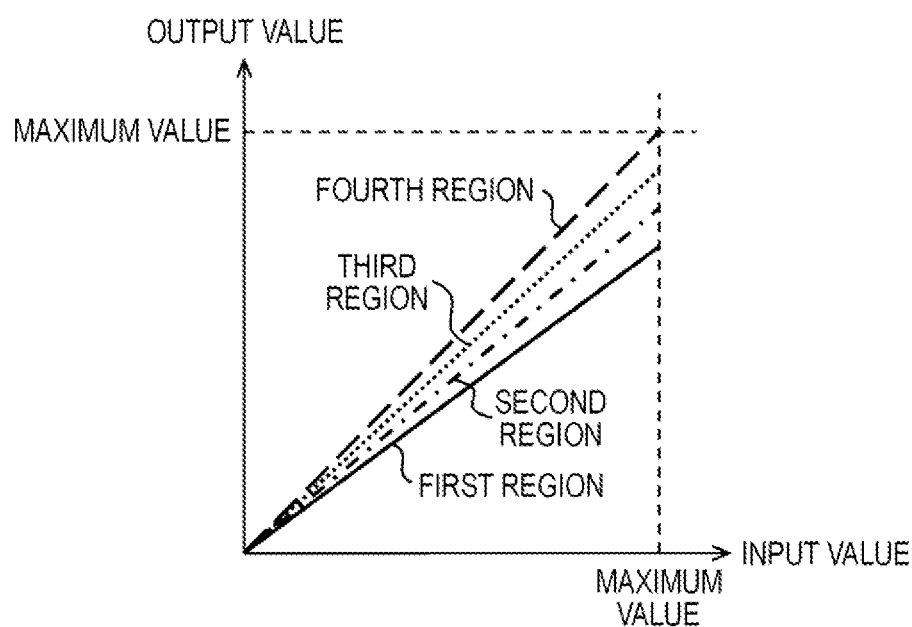
FIG. 8 is a diagram illustrating a relation between input values and output values shown in a correction table with regard to single color.

FIG. 8 is a diagram illustrating a relation between input values and output values shown in a correction table with regard to single color.

FIG. 8 relates to a correction table generated when the straight-line approximation expression indicating an approximate curved line of FIG. 7 is obtained.

When the table generation unit 8257 updates the correction table in this way, the processor 821 proceeds to ACT4 in FIG. 5.

In ACT4, the processor 821 confirms whether automatic adjustment of density associated with the updating of the correction table is set to ON. ON or OFF of the automatic adjustment is set appropriately by the user performing, for example, a predetermined operation on the operation panel 105. Then, for example, setting information indicating the setting is generated by the processor 821 and is stored in the auxiliary storage unit 823. In ACT4, the processor 821 performs determination based on the setting information stored in the auxiliary storage unit 823. When the automatic adjustment is set to OFF, the processor 821 determines NO and proceeds to ACT5.

In ACT5, the processor 821 prints a confirmation image. For example, the processor 821 starts operations of the image forming units 24-1 to 24-4, and then reads the confirmation image data DAB stored in the auxiliary storage unit 823 and sends the read confirmation image data DAB to the four raster image processing units 8251. The confirmation image indicated by the confirmation image data DAB is an image in which the maintenance worker can visually confirm density at the time of printing. For example, a designer or the like of the MFP 100 may determine any content of the confirmation image.

The confirmation image data is subjected to a process of each of the raster image processing unit 8251, the image conversion unit 8252, the correction unit 8253, and the halftone processing unit 8255 and is supplied to the exposure unit 25. The confirmation image is formed on the image carrying surface of the belt 20 through a known forming operation performed by the image forming units 24-1 to 24-4 and the exposure unit 25. A print sheet to which the confirmation image formed on the image carrying surface of the belt 20 has been transferred and fixed by the transfer roller 26 and the fixing unit 3 are discharged to the discharging tray 5.

Since the correction unit 8253 corrects the confirmation image printed on the print sheet in this way using the immediately previous updated correction table, as described above, the in-plane irregularity is considerably reduced. Here, the correction table is generated by setting a region where a read value is the smallest as a reference region and reducing output values in the other regions, and thus the overall density of an image printed after the updating decreases before and after the updating of the correction table.

Accordingly, the maintenance worker visually confirms the confirmation image printed on the print sheet discharged to the discharging tray 5 and determines whether the density is too low. When the maintenance worker determines that the density is too low, for example, the maintenance worker performs a predetermined operation on the operation panel 105 to give an instruction for density adjustment. When the maintenance worker determines that there is no problem in the density, for example, the maintenance worker performs a predetermined operation on the operation panel 105 to give an instruction for completion.

Then, when printing of the confirmation image ends, the processor 821 proceeds to ACT6 in FIG. 5.

In ACT6, the processor 821 confirms whether an instruction for the density adjustment is given. When a corresponding event cannot be confirmed, the processor 821 determines NO and proceeds to ACT7.

In ACT7, the processor 821 confirms whether an instruction for completion is given. When a corresponding event cannot be confirmed, the processor 821 determines NO and returns to ACT6.

Thus, the processor 821 waits for an adjustment instruction or a completion instruction in ACT6 and ACT7. When the instruction for density adjustment is given, as described above, the processor 821 determines YES in ACT6 and proceeds to ACT8.

When the automatic adjustment is set to ON, the processor 821 determines YES in ACT4 and proceeds to ACT8 without performing ACT5 to ACT7.

In ACT8, the processor 821 forms a measurement pattern. For example, the processor 821 starts the operations of the image forming units 24-1 to 24-4, and then reads the measurement pattern data DAC stored in the auxiliary storage unit 823 and sends the read measurement pattern data DAC to four raster image processing unit 8251. A measurement pattern indicated by the measurement pattern data DAC is a pattern in which an image with a density value determined in advance according to each color is formed in a region passing through a measurement position by the adhesion amount sensor 71 in the image carrying surface of the belt 20. For example, the designer or the like of the MFP 100 may determine the foregoing density value to any value.

The measurement pattern data DAC is subjected to a process of each of the raster image processing unit 8251, the image conversion unit 8252, the correction unit 8253, and the halftone processing unit 8255, and then is supplied to the exposure unit 25. Through a known forming operation by the image forming units 24-1 to 24-4 and the exposure unit 25, the confirmation image is formed on the image carrying surface of the belt 20. Thus, when a region where the measurement pattern is formed on the image carrying surface of the belt 20 passes through the measurement position by the adhesion amount sensor 71, an adhesion amount of toner for each color is measured in sequence by the adhesion amount sensor 71.

When the measurement pattern data DAC is formed, the processor 821 does not send the print sheet between the support roller 23 and the transfer roller 26.

In ACT9, the processor 821 acquires the adhesion amount of each color measured by the adhesion amount sensor 71 with regard to the measurement pattern, as described above. When the adhesion amount for the measurement pattern is measured, the adhesion amount sensor 71 functions as a measurement unit. For example, the processor 821 may acquire a difference as the adhesion amount by calculating the difference between an output value of the adhesion amount sensor 71 on the image carrying surface of the belt 20 on which no toner is adhered and an output value of the adhesion amount sensor 71 when the region where the measurement pattern is formed passes through the measurement position by the adhesion amount sensor 71.

In ACT10, the processor 821 determines an adjustment amount of the entire density. For example, the processor 821 compares each adhesion amount for each color acquired in ACT9 with a target amount determined in advance for each color to obtain a difference between each adhesion amount and the target amount. A change amount of a development bias for approaching the difference to zero is determined for each color and the determined change amount is set as an adjustment amount. The target amount is an adhesion amount which is to be measured by the adhesion amount sensor 71 in a state in which an amount of toner appropriate in accordance with the density value of the measurement pattern is adhered to the image carrying surface. For example, the target amount is appropriately determined by the designer or the like of the MFP 100.

For example, it is assumed that the processor 821 calculates an adjustment amount through calculation of a predetermined calculation expression. At this time, since a relation between the difference and a change amount of development bias is changed in accordance with the configuration of the developing unit 243 and a property of the developer, the relation is determined, for example, by the designer or the like of the MFP 100 in consideration of the configuration of the developing unit 243 and the property of the developer.

In ACT11, the processor 821 changes the entire density. For example, the processor 821 changes the setting value of the development bias in the high-voltage power supply 246 by the change amount determined as described above. When the image forming units 24-1 to 24-4 are operating, the high-voltage power supply 246 supplies a development bias of a voltage value in accordance with the setting value to each of the provided developing sleeves 2432. Accordingly, the image forming units 24-1 to 24-4 subsequently perform image forming when the development bias of the voltage in accordance with the changed setting value is supplied to the developing sleeve 2432. Accordingly, the developing density in the developing unit 243 is changed, and thus the density of an image formed uniformly regardless of a position in the main scanning direction is changed. That is, the entire density of the image is adjusted uniformly. When the density decreases in association with updating of the correction table, the entire density of the image is increased uniformly to compensate for the decrease in the density.

Then, the processor 821 ends the adjustment process of FIG. 5. When the completion instruction is given in a waiting state of ACT6 and ACT7, the processor 821 determines YES in ACT7 and ends the adjustment process of FIG. 5 without performing ACT8 to ACT11.

By performing the adjustment process described above, the processor 821 uniformly adjust the density in the first to fourth regions so that the image formation density approaches the target density after the correction table which is an example of the correction data is updated in response to the start instruction by the operator. Thus, when the processor 821 performs the information processing based on the information processing program, the computer in which the processor 821 is a central unit functions as a control unit.

As described above, when the correction table for correcting in-plane irregularity is updated, the MFP 100 changes a development bias to compensate for a change in the density of the image formed in accordance with a change in the relation between a grayscale value and an exposure amount accordingly. Therefore, it is possible to improve accuracy of the correction of the in-plane irregularity by updating the correction table to achieve a reduction in the in-plane irregularity and thus it is possible to prevent a change in the density of an entire image in association with the updating. Further, the MFP 100 sets an adjustment amount of formation density of an entire image based on a measurement result of an adhesion amount of toner by actual development so that the density of the entire image to be formed approaches a target value, and thus it is possible to achieve the adjustment so that the image can be formed with the target density.

When the correction table for correcting the in-plane irregularity is updated, the MFP 100 changes the entire density in response to an instruction from the maintenance worker after the MFP 100 prints a confirmation image so that the maintenance worker confirms the density. Therefore, when a change in the density associated with the updating of the correction table is small, it is possible to cause the entire density not to be changed.

When the automatic adjustment is set to ON, the MFP 100 automatically changes the entire density without receiving an instruction from the maintenance worker. Therefore, by setting the automatic adjustment to ON, it is possible to omit labor of the maintenance worker.

A user or the like can freely set whether the MFP 100 automatically changes the entire density.

The embodiment can be modified into various forms as follows.

The MFP 100 may not have the function of updating the correction table. For example, when the correction table is rewritten from the outside, the processor 821 may perform the process after ACT4 in FIG. 5.

The automatic adjustment function may be omitted. That is, the processor 821 may cause the process to proceed from ACT3 to ACT5 in FIG. 5, for example.

The entire density may be necessarily changed after the correction table is updated without performing the confirmation using the confirmation image. That is, the processor 821 may cause the process to proceed from ACT3 to ACT8 in FIG. 5, for example.

When the entire density is changed in response to a density adjustment instruction through the confirmation using the confirmation image, the confirmation may be performed again using the confirmation image. That is, the processor 821 may repeat the process from ACT5 onwards after end of ACT11, for example, when the process proceeds from ACT6 to ACT8 in FIG. 5.

The test image IM may be read by any reading device externally attached to the MFP 100.

A device that forms an image in conformity with an electrographic scheme, processes similar to the foregoing processes can be performed even in various apparatuses such as a copy machine, a printer, and a facsimile apparatus other than an MFP.

The change in the entire density may be implemented through a change in an exposure strength by the exposure unit 25 or a charging potential on the photoconductive surface by the charging roller 242, a change in the density value in the image data, or the like. The change in the entire density may be implemented through a change in a toner density in accordance with each developer when multi-component type developer is used. Alternatively, the development bias, the exposure strength, the charging potential, the density value, the toner density, and the like may be changed in plurality. For example, when the entire density is changed by changing a condition which is not specific to the electrographic scheme, such as a change in a density value in image data, the process of correcting in-plane irregularity and the scheme of changing the entire density can be used without a change in a different type of printer from the electrographic scheme.

The number of image forming units is not limited to four and at least one image forming unit may be included.

Some or all of the functions implemented by the processor 821 through the information processing in the foregoing embodiment can also be implemented by hardware performing information processing which is not based on a program such as a logical circuit. The foregoing functions can also be implemented by combining software control with hardware such as the foregoing logical circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   a forming component configured to form an image;
   a storage component configured to store correction data for correcting density irregularity in each of a plurality of regions obtained through division in a main scanning direction of the image formed by the forming component;
   a correction component configured to correct a density of the image formed by the forming component for each of the plurality of regions based on the correction data stored in the storage component;
   a measurement component configured to measure an image formation density by the forming component in association with the correction by the correction component; and
   a changing component configured to change the image formation density by the forming unit with a uniform change amount in the plurality of regions so that the image formation density measured by the measurement component approaches a predetermined target density.

2. The image forming apparatus according to claim 1,
wherein the forming component forms an image on another image formation medium by transferring an image formed on a temporary image carrying body to the image formation medium, and
wherein the measurement component measures an image formation density on the temporary carrying body.

3. The image forming apparatus according to claim 1,
wherein the forming component includes a developing component that causes toner to adhere to a developing sleeve to a photoconductor using a potential difference between the developing sleeve and the photoconductor, and
wherein the changing component changes a voltage to be applied to a roller to change the potential difference between the developing sleeve and the photoconductor so that that the image formation density measured by the measurement component approaches the predetermined target density.

4. The image forming apparatus according to claim 1, further comprising:
a generation component configured to generate correction data for correcting density irregularity in each of the plurality of regions obtained through division in the main scanning direction of the image formed by the forming component and to update the correction data stored in the storage component in accordance with the correction data,
wherein the measurement component measures the image formation density by the forming component in association with the correction by the correction component after the generation component generates the correction data.

5. The image forming apparatus according to claim 4, further comprising a controller configured to cause the changing component to change the image formation density by the forming component after the generation component is caused to update the correction data in response to a start instruction by an operator.

6. The image forming apparatus according to claim 5, wherein the correction component updates the correction data so that a density in another region decreases so as to match a minimum density among the densities of the plurality of regions.

7. The image forming apparatus according to claim 5, wherein the generation component causes the forming component to perform an image formation based on image data indicating a test image in which a patch with the same density value is disposed in each of the plurality of regions in association with the correction of the correction component and determines a degree of irregularity in the density of each of the patches disposed in the plurality of regions based on image data obtained by reading the test image.

8. The image forming apparatus according to claim 7, wherein the generation component determines the degree of irregularity as a difference between the density of each patch and a minimum value among the densities of the patches disposed in the plurality of regions in the test image.

9. The image forming apparatus according to claim 7, further comprising:
a reading component configured to read an image,
wherein the generation unit determines the degree of irregularity in the density of each of the patches disposed in the plurality of regions based on image data obtained by causing the reading component to read the test image formed by the forming component.

10. The image forming apparatus according to claim 5,
wherein the forming component includes a plurality of element image forming components that form different color element images,
wherein the generation component generates correction data for correcting density irregularity in each of a plurality of regions obtained through division in a main scanning direction of the element images formed by each of the plurality of element image forming components in association with each of the plurality of element image forming components,
wherein the storage component stores a plurality of pieces of correction data generated by the generation component,
wherein the correction component corrects density of each of the element images formed by the element image forming components for each of the plurality of regions based on the plurality of pieces of correction data stored in the storage component, and
wherein the changing component changes each image formation density by the element image forming component with the uniform change amount in the plurality of regions in accordance with the generation of the correction data by the generation component.

11. A method of improving image density in an image forming apparatus, comprising:
storing correction data for correcting density irregularity in each of a plurality of regions obtained through division in a main scanning direction of an image formed by a forming component;
correcting a density of the image formed by the forming component for each of the plurality of regions based on the correction data stored;
measuring an image formation density by the forming component in association with the correction; and
changing the image formation density by the forming unit with a uniform change amount in the plurality of regions so that the image formation density measured approaches a predetermined target density.

12. The method according to claim 11, further comprising:
forming an image on another image formation medium by transferring an image formed on a temporary image carrying body to the image formation medium, and
measuring an image formation density on the temporary carrying body.

13. The method according to claim 11, further comprising:
causing toner to adhere to a developing sleeve to a photoconductor using a potential difference between the developing sleeve and the photoconductor, and
changing a voltage to be applied to a roller to change the potential difference between the developing sleeve and the photoconductor so that that the image formation density measured approaches the predetermined target density.

14. The method according to claim 11, further comprising:
generating correction data for correcting density irregularity in each of the plurality of regions obtained through division in the main scanning direction of the image formed by the forming component and updating the correction data stored in accordance with the correction data, and measuring the image formation density by the forming component in association with the correction after generating the correction data.

15. The method according to claim 14, further comprising:
changing the image formation density by the forming component after updating the correction data in response to a start instruction by an operator.

16. The method according to claim 15, further comprising:
updating the correction data so that a density in another region decreases so as to match a minimum density among the densities of the plurality of regions.

17. The method according to claim 15, further comprising:
forming an image based on image data indicating a test image in which a patch with the same density value is disposed in each of the plurality of regions in association with the correction and determining a degree of irregularity in the density of each of the patches disposed in the plurality of regions based on image data obtained by reading the test image.

18. The method according to claim 17, further comprising:
determining the degree of irregularity as a difference between the density of each patch and a minimum value among the densities of the patches disposed in the plurality of regions in the test image.

19. The method according to claim 17, further comprising:
reading an image, and
determining the degree of irregularity in the density of each of the patches disposed in the plurality of regions based on image data obtained by reading the test image formed by the forming component.

20. The method according to claim 15,
wherein the forming component includes a plurality of element image forming components that form different color element images, and further comprising:
generating correction data for correcting density irregularity in each of a plurality of regions obtained through division in a main scanning direction of the element images formed by each of the plurality of element image forming components in association with each of the plurality of element image forming components,
storing a plurality of pieces of correction data generated,
correcting density of each of the element images formed by the element image forming components for each of the plurality of regions based on the plurality of pieces of correction data stored, and
changing each image formation density by the element image forming component with the uniform change amount in the plurality of regions in accordance with the generation of the correction data.

* * * * *